(12) United States Patent
Weaver

(10) Patent No.: US 7,670,532 B1
(45) Date of Patent: Mar. 2, 2010

(54) GOLF CLUB HEAD AND METHOD OF MAKING THE SAME

(76) Inventor: William R. Weaver, 4380 River Rd., Toledo, OH (US) 43614

( * ) Notice: Subject to any disclaimer, the term of this patent is extended or adjusted under 35 U.S.C. 154(b) by 747 days.

(21) Appl. No.: 11/435,653

(22) Filed: May 17, 2006

Related U.S. Application Data

(60) Provisional application No. 60/681,783, filed on May 17, 2005.

(51) Int. Cl.
B29C 33/52 (2006.01)
B29C 53/60 (2006.01)

(52) U.S. Cl. ............... 264/317; 264/DIG. 44; 156/173

(58) Field of Classification Search ........... 264/317, 264/DIG. 44; 156/173; 242/444
See application file for complete search history.

(56) References Cited

U.S. PATENT DOCUMENTS

| | | | |
|---|---|---|---|
| 3,692,551 A | 9/1972 | Weaver | |
| 3,962,393 A * | 6/1976 | Blad | 264/571 |
| 4,464,324 A | 8/1984 | Hager | |
| 4,883,623 A * | 11/1989 | Nagamoto et al. | 264/108 |
| 5,000,454 A | 3/1991 | Soda | |
| 5,045,251 A * | 9/1991 | Johnson | 264/408 |
| 5,614,143 A | 3/1997 | Hager | |
| 6,146,571 A | 11/2000 | Vincent et al. | |
| 6,248,025 B1 | 6/2001 | Murphy et al. | |
| 6,666,941 B2 * | 12/2003 | Nakamura | 156/155 |
| 6,824,636 B2 | 11/2004 | Nelson et al. | |

FOREIGN PATENT DOCUMENTS

GB 2128539 A 5/1984

OTHER PUBLICATIONS

Darrow, Carol, UV curing sets the stage for efficient filament winding, High-Performance Composites magazine, Mar./Apr. 1997, pp. 67-69, publisher & city/country unknown.

* cited by examiner

*Primary Examiner*—Joseph S. Del Sole
*Assistant Examiner*—Robert Dye
(74) *Attorney, Agent, or Firm*—Marshall & Melhorn, LLC

(57) ABSTRACT

A golf club head and a method of making a golf club head are disclosed. The method provides for winding a single continuous filament multiple times about a soluble core. The wound core is located in a mold and pressure coated with a pure or non-continuous fiber filled resin. The resin is allowed to cure to form a filament and resin shell about the core. The soluble core is removed leaving the continuous filament in the shell.

6 Claims, 7 Drawing Sheets

GOLF CLUB HEAD AND METHOD OF MAKING THE SAME

RELATED APPLICATION

This application is claiming the benefit, under 35 U.S.C. 119(e), of the provisional application filed May 17, 2005 under 35 U.S.C. 111(b), which was granted Ser. No. 60/681,783. This provisional application is hereby incorporated by reference.

BACKGROUND OF THE INVENTION

1. Field of the Invention

The present invention relates to golf club heads, more particularly of the composite metal "wood" type, and a method of making golf club heads.

2. Description of the Background and Relevant Information

Wood-type golf club heads traditionally were made from wood, e.g., persimmon. However, with advances in materials, wood-type golf club heads are currently predominantly made from high performance metals such as titanium, and other materials such as fiber-reinforced plastics. Many club heads made from fiber resin composite materials are compression molded around relatively rigid molding cores. In instances where a hollow interior cavity is desired, dispersible cores made from meltable materials such as wax or low melting point metals have been employed.

Wood-type club heads made predominantly of metal may be fabricated by welding or adhesively joining together edges of two or more thin sections of a club head shell made of metal such as stainless steel, beryllium copper, aluminum, titanium, etc., thereby producing a one-piece shell.

For some years now, heads made entirely of a composite material, with the exception of the sole, have been manufactured. Such types of constructions are rarely favored by professional players because they are most often made of a single element, by the compression molding method, without any particular regard to the distribution of mass.

A head made of a plastic material is disclosed in British Patent Publication No. 2,128,539. This head is made of a single thermoplastic element injected into a mold around a meltable core. The head thus manufactured does not allow a good control over the trajectory of the balls because the problem of balancing the club is not resolved.

U.S. Pat. No. 5,000,454 discloses a head made of a reinforced plastic material and comprising an element acting both as the reinforcement of the striking face and as the balancing weight. However, such a structure does not yet permit the club to be balanced satisfactorily.

U.S. Pat. No. 6,824,636 B2 is directed to a method for the manufacture of a hollow three-dimensional fiber golf club head wherein a fluid-removable core shaped in the general form of the golf club head is placed in a flexible pressurizable bladder surrounding the core. At least one ply fiber impregnated with a curable resin is wrapped over the core and bladder, and a cured part is formed by pressurizing the bladder while the core, bladder and impregnated fiber is in a female mold to force the plies against the inner surface of the mold. After heating to cure the resin, the bladder and the fluid removable core is removed from the interior of the cured part by disintegrating the core with a fluid sufficient to allow removal of the bladder. This method is complex and difficult of reproduction on a commercial scale.

SUMMARY OF THE INVENTION

It is an object of the present invention to overcome the disadvantages inherent to the above described and traditional methods and resulting structures of club heads, and to provide a new head design as well as a new method of manufacturing such head.

Thus, one of the more specific objects of the invention is to provide a manufacturing method enabling a more efficient new head structure to be obtained, especially as regards distribution of mass, durability, and finishing quality. The method according to the invention is particularly adapted to the large scale production of elements requiring a minimum number of operations to produce what might be considered a complex yet highly advantageous golf club head.

Thus, according to the invention, a method of manufacturing a golf club is disclosed. The method is comprised of the following steps. A single continuous filament is wound multiple times about a soluble core. The wound core is then located in a mold. The wound core is then pressure coated with a resin in the mold. The resin disperses among the filament windings. The resin is allowed to cure and form a filament and resin shell about the core. The soluble core is then removed from the shell while the continuous filament is retained within the shell.

The shell has an inside surface and an outside surface. The inside surface defines a substantially hollow interior portion and the inside surface has a plurality of ribs that extend into the interior portion. The ribs and the shell are substantially comprised of the resin and the single continuous filament located within the resin.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of invention. Hence, specific dimensions, directions or other physical characteristics relating to the embodiments disclosed are not to be considered as limiting, unless expressly stated otherwise.

Figure 1:
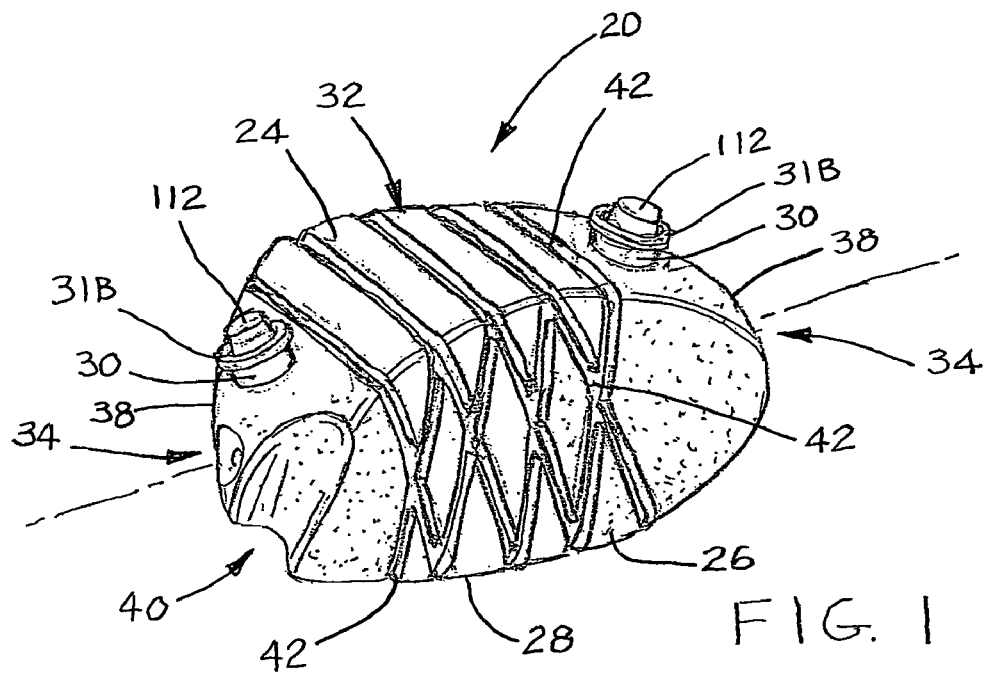
FIG. 1 is a schematic, perspective view of an embodiment of a component for use in the method of the present invention.

Referring to FIG. 1, a preferred embodiment of a golf club head core 20 is depicted. The golf club head core 20 is preferably made by the process and materials described in U.S. Pat. No. 3,692,551, which is incorporated by reference in its entirety into the present specification.

Figure 1A:
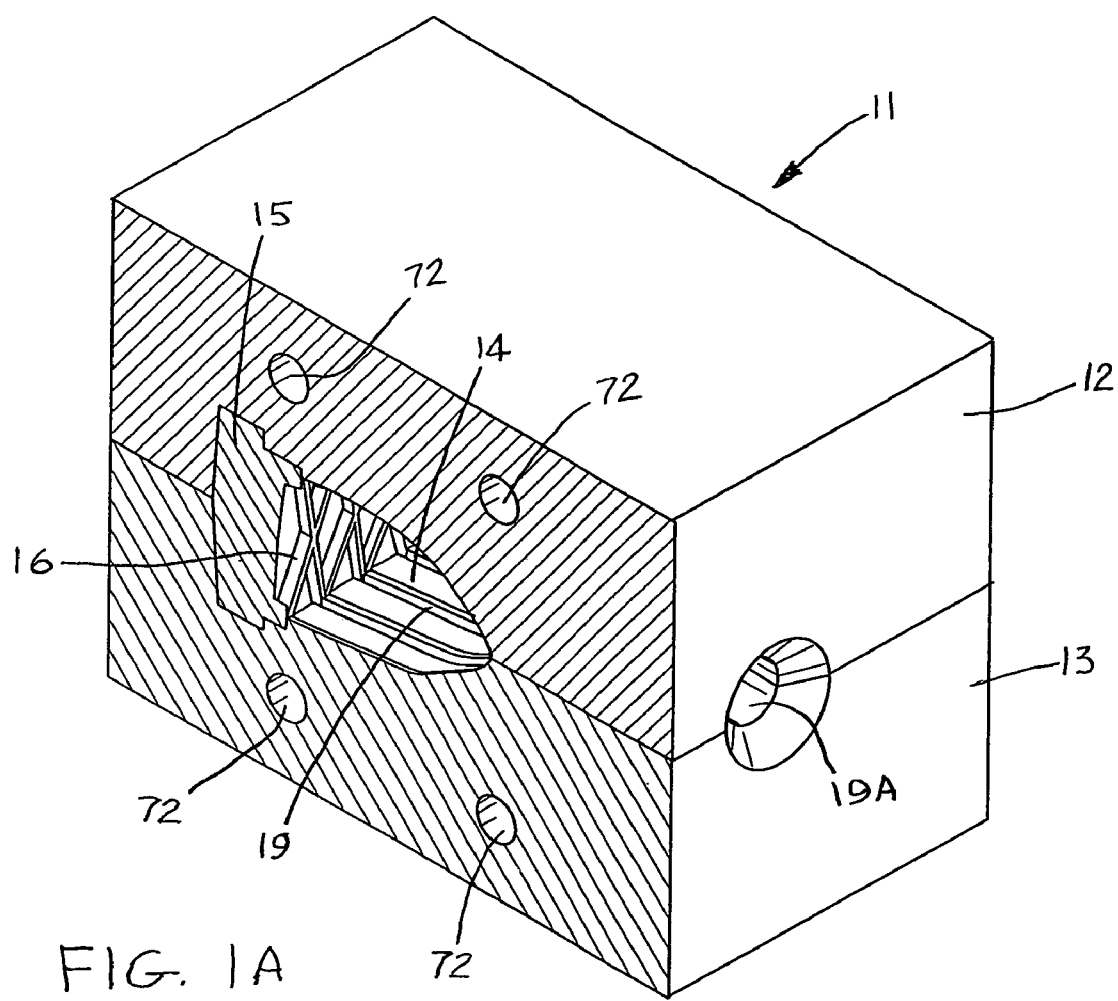
FIG. 1A depicts a cross-sectional view of a mold for forming the component depicted in FIG. 1.

By way of example only, FIG. 1A depicts a preferred embodiment of a mold 11 which may be used to form the core 20 depicted in FIG. 1. The mold 11 preferably has a first half 12 and a second half 13 which are separable from one another. The first half 12 and the second half 13 define an interior chamber 14 having a substantially similar shape to the shape of the core 20. A core front face block 15 is preferably located with the interior chamber 14. The core front face block 15 has a plurality of ribs 16 extending into the interior chamber 14. The ribs 16 will be used to form grooves in the front face of the core 20, which are described in detail below.

A plurality of ribs 19 extend into the interior chamber 14 from the first half 12 and the second half 13. The ribs 19 will be used to form grooves in the upper surface of the core 20 and the lower surface of the core 20, as described below.

Those skilled in the art will appreciate that the core front face block 15 may have any design, including any pattern of ribs or shapes to create a core 20 having any desired shape.

The mold 11 preferably has at least one sprue 19A for introducing the core material (not shown) into the interior chamber 14 from outside of the mold 11. The mold 11 may have means to heat or cool to solidify the core material so that the core material conforms to the core front face block 15. Alternatively, if the core material does not require heat and/or cooling to set up, then such means are not required. The ribs 16, 19 extending into the interior chamber 14 from the core front face block 15 form grooves in the core material, discussed below. The heat and/or pressure, if required, exerted by the mold 11 on the core material create a core 20 which, in a preferred embodiment, looks like the core 20 depicted in FIG. 1.

Referring to FIG. 1, the core 20 is preferably shaped to have a somewhat curvilinear front face 26, a curvilinear upper surface 28 and the curvilinear lower surface 24. In FIG. 1, the core 20 is located upside down so that at least two core prints 112 can be clearly seen.

Preferably, an insert 30 is at least partially formed into the core 20 about each core print 112. The insert 30, thus, is positioned within the core 20 when the core 20 is formed as described above. The insert 30 may have a first circumferential ring 31A (seen in FIG. 3) which helps secure the insert 30 in the core 20. The insert 30 also preferably has a second circumferential ring 31B (seen in FIGS. 1 and 3) which will be received within a resin, described in more detail below.

Figure 9:
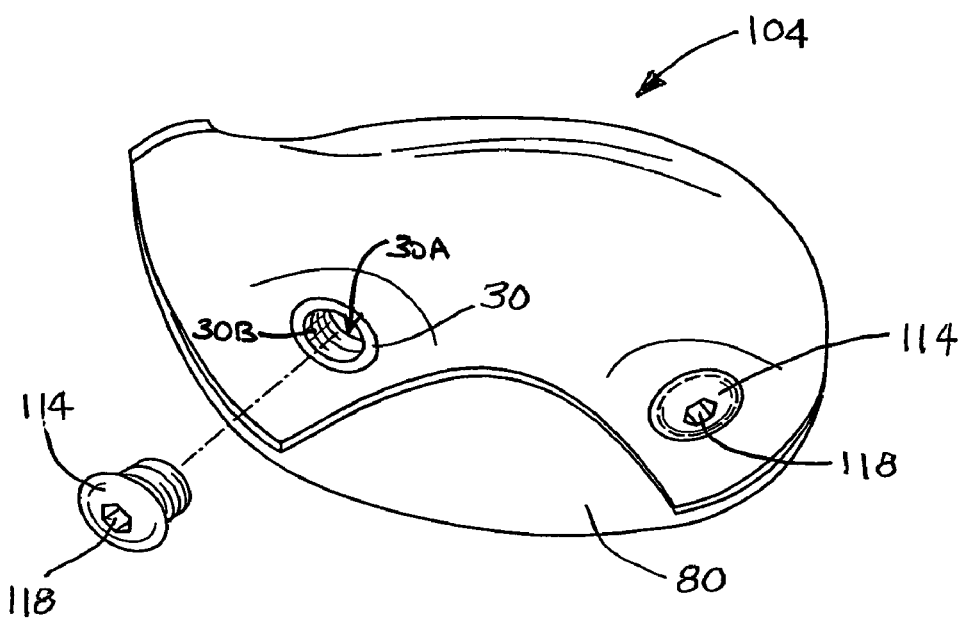
FIG. 9 is a schematic, perspective view of one embodiment of the bottom of a club head of the invention.

As best seen in FIG. 9, the inserts 30 are preferably cylindrical in shape with a hollow interior portion 30A. The inserts 30 have a threaded inner surface 30B.

The upper surface 28 and the lower surface 24 preferably taper away from the front face 26 until they meet at a rearward portion 32 of the core 20. Side portions 34 of the upper and lower surfaces 24, 28 also preferably taper toward one another. Although a preferred embodiment of the upper and lower surfaces 24, 28 is depicted in the figures, those skilled in the art will appreciate that the core 20 can be constructed with any number of surfaces, edges, depressions or curves and have any shape or size. By way of example only, the upper and lower surfaces 24, 28 can taper to a rear surface (not shown), rather than to a rounded edge 36. Additionally, the side portions 34 of the upper and lower surfaces 24, 28 can taper to side surfaces 34, rather than to rounded side edges 38, as shown in FIG. 1.

In the preferred embodiment, a depression 40 in the core 20 is provided adjacent one side of the front face 26. The depression 40 will be used to form a portion of the finished golf club head that will receive a shaft, as described in more detail below.

Preferably, the at least two core prints 112 extend away in a substantially perpendicular fashion from the lower surface 24 of the core 20. Each core print 112 is preferably positioned in an area of the lower surface 24 of the core 20 adjacent one of the side portions 34. The core prints 112 can be positioned in any area on the lower surface 24 between the front face 26 and the rearward portion 32 of the core 20. However, in the preferred embodiment, the core prints 112 are closer to the rearward portion 32 than the front face 26 of the core 20 to lower the center of gravity of the finished golf club head.

Referring to FIG. 1, a plurality of grooves 42 is preferably located across the front face 26, the lower surface 24 and the upper surface 28 of the core 20. The grooves 42 extend diagonally across the front face 26 of the core 20 to intersect one another; however, it is within the scope of the present invention to extend the grooves 42 across the front face 26 in any orientation, whether intersecting or not. Additionally, although FIG. 1 depicts the grooves 42 continuously extending across the face 26, it is within the scope of the present invention to interrupt one or more of the grooves 42, either on the front face 26 of the core 20, or in any other area of the core 20. The preferred embodiment of the invention also locates the grooves 42 at a constant depth in the core 20, although variable depths are within the scope of the invention.

In the preferred embodiment, the grooves 42 extend from the front face 26 rearward across the lower surface 24 of the core 20 and rearward from the front face 26 across the upper surface 28 of the core 20. Although the grooves 42 are depicted as parallel to one another on the lower surface 24 of the core 20, and they are preferably located parallel to one another on the upper surface 28, it is within the scope of the present invention for the grooves 42 to extend in a non-parallel fashion across the lower surface 24 and the upper surface 28 of the core 20.

Figure 2:
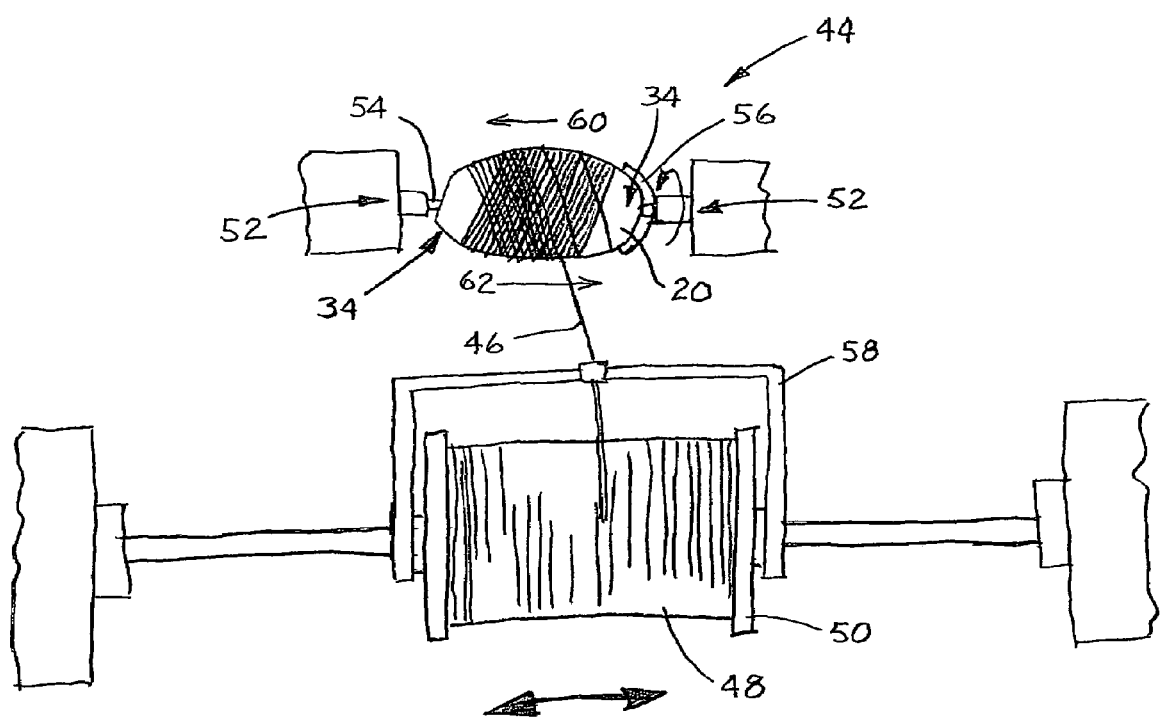
FIG. 2 is a schematic view of one embodiment of a filament winding machine and the component of FIG. 1 of the present invention.

As shown in FIG. 2, the above-described core 20 is located in a filament winding machine 44, known to those skilled in the art, for winding a continuous filament 46 about a workpiece. Filament winding machines 44 within the scope of the present invention, but which in no way limit the present invention, are those made by McClean Anderson of Schofield, Wis. Such machines 44 typically have a supply of filament 48 on at least one spool 50. The spool 50 is preferably moveable via control by a computer (not shown) through multiple axes of rotation with respect to the core 20 located in a bit mechanism 52.

The bit mechanism 52 comprises a tapered point 54 on one end for engaging one side portion 34 of the core 20 and a clamp 56 on the other end for engaging the opposite side portion 34 of the core 20. The clamp 56 may be, by way of example, a contoured fit split clamp. Preferably, the bit mechanism 52 is rotated about at least one axis by a motor (not shown) controlled by the same computer to coordinate the rotation of the bit mechanism 52 with the movement of the spool 50.

Machines capable of having a plurality of supplies of filament 48 and which are capable of controlling more than one spool 50 to simultaneously wind a plurality of cores 20 are also within the scope of the present invention.

In the preferred embodiment, the filament 46 on the filament winding machine 44 is a continuous strand of carbon fiber filament. Other continuous strands of filament 46, such as Kevlar® manufactured by the E.I. Du Pont Nemours Company of Wilmington, Del., may be used without departing from the scope of the present invention. Regardless of the composition of the filament 46 selected, the filament 46 should have physical and performance characteristics comparable to carbon fiber filament or Kevlar® filaments.

The filament-winding machine 44 may also comprise one or more tensioners 58 for providing a pre-determined amount of tension to the filament 46. The machine 44 may also comprise a resin dispenser (not shown) or a resin bath or drum (not shown) for applying resin to the filament 46.

In the preferred embodiment, the filament 46 is first wound into the grooves 42 of the core 20. By way of example only, the filament 46 is started in one groove 42 on one side portion 34 of the core 20 and the filament 46 is wound across the core 20 in a first direction 60. When the filament 46 is wound about the last groove 42 on the opposite side portion 34 of the core 20, the filament 46 is moved inwardly to continue winding across the channels 42 in a second direction 62. Those skilled in the art will appreciate that the first and second directions 60, 62 can be reversed from those depicted in FIG. 2.

Preferably, filament 46 is repeatedly wound within the grooves 42 as described above until the filament 46 within the grooves 42 is substantially planar with the front face 26, the upper surface 28 and/or the lower surface 24. In the preferred embodiment, the same strand of continuous filament 46 is then wound across the front face 26, the upper surface 28 and the lower surface 24 to substantially cover each of those surfaces. The filament 46 is preferably wound across the core 20 from the first direction 60 to the second direction 62. The present invention also includes winding the filament 46 across the core 20 in any pattern, design or orientation after the grooves 42 have been wound. The curvilinear shape of the core 20 may prevent winding the entire core 20 in substantially one direction as the filament 46 can slide off one of the side portions 34, however, it is preferred to cover each of the surfaces 26, 28, 24 as much as possible with a uniform layer of filament 46.

In the preferred embodiment, the core 20 is wrapped in the continuous strand of filament 46 to provide a layer of filament 46 above at least one of the surfaces 24, 26, 28 of the core 20 from approximately one five thousandths (0.005") of an inch to one ninety thousandths (0.090") of an inch.

In another embodiment, the core 20 may be wrapped, e.g., vertically, with additional filament 46 after the initial layer of continuous filament 46 has been completed. The additional filament 46 may be continuous or non-continuous and it may be located across the entire core 20, or only selected portions of the core 20, for example, the ends. The additional filament 46 may be of the same material as the initial layer, or it may be of a different material.

Figure 3:
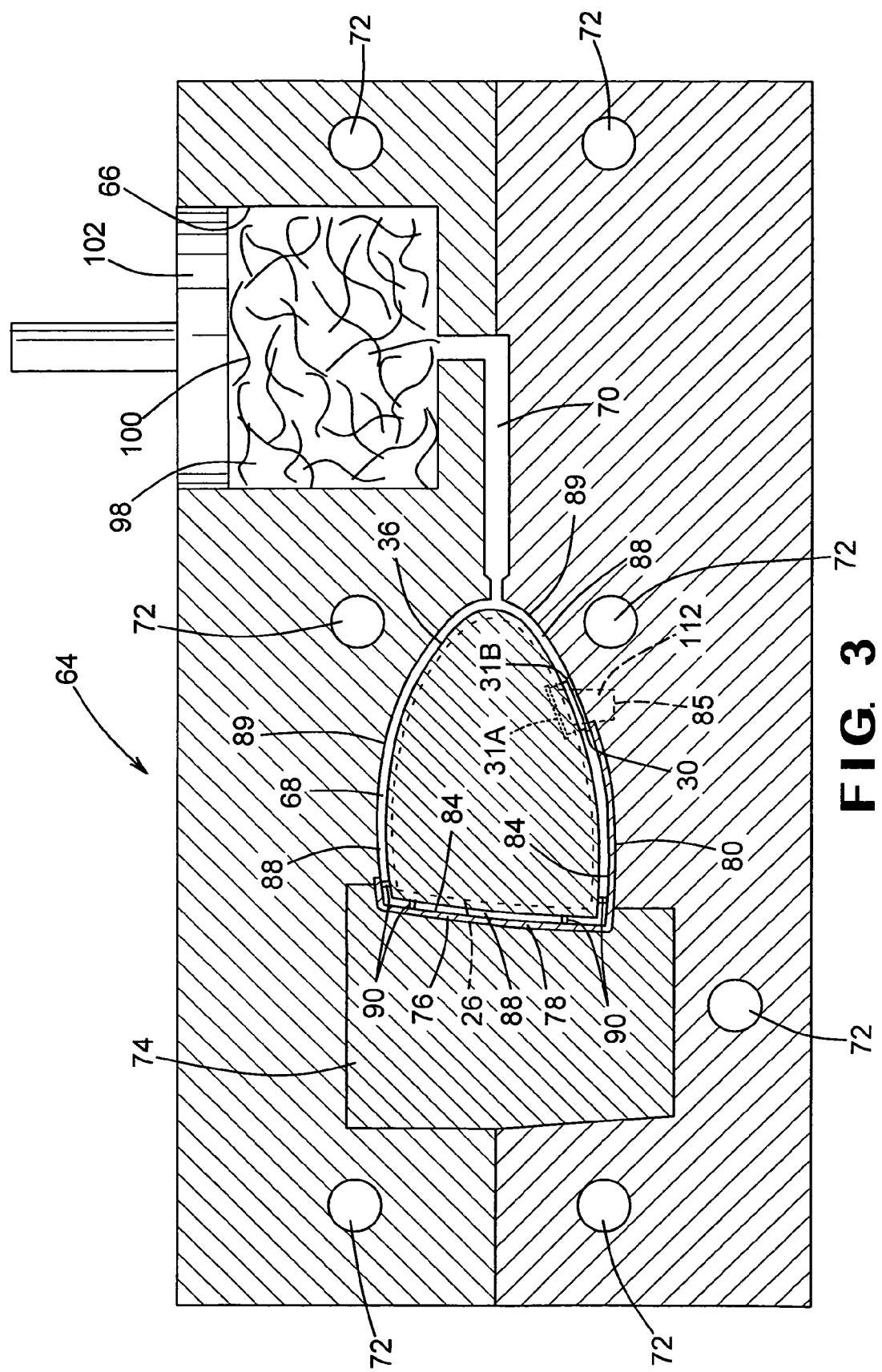
FIG. 3 is a schematic, cross-sectional view of one embodiment of a mold for use in the method of the present invention.

The wound core 20 is then removed from the filament-winding machine 44 and located in a mold. A preferred embodiment of a cross-section of a mold is depicted in FIG. 3. The mold may be an injection mold, a transfer mold, or a compression mold, as known by those skilled in the art.

In the embodiment depicted in FIG. 3, a transfer mold 64 is shown. The mold 64 has a material reservoir 66 in fluid communication with a chamber 68 via at least one channel 70. One or more electric coils 72 are located throughout the mold 64 for heating the mold 64, although channels (not shown) for heated oil and/or steam may also be used in conjunction with the electric coils 72 or alone.

A removable insert 74 is located within the chamber 68. The insert 74 has a wall 76 having a complementary shape to at least the wound front face 26 of the core 20. Inserts 74 having walls 76 at various angles, which determines loft in degrees of the club face, and sizes with respect to the wound front face 26 of the core 20 may be used to locate a face plate 78 at various desired angles.

Figure 4:
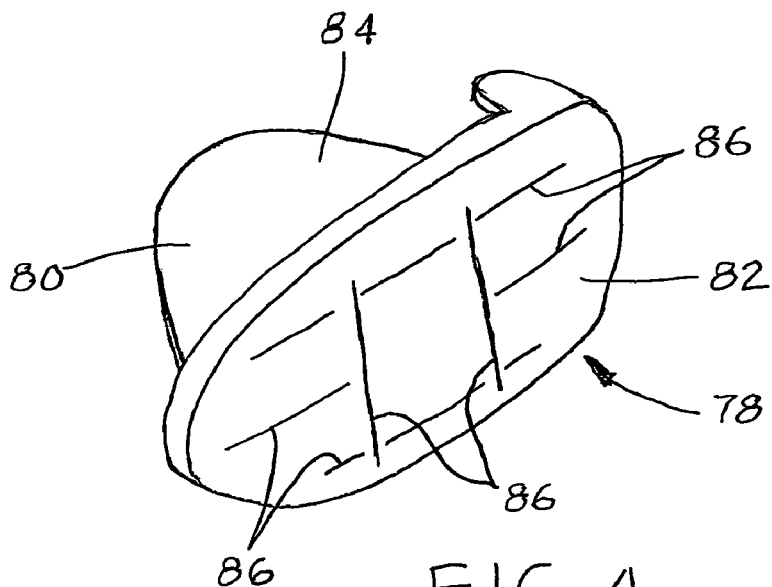
FIG. 4 is a schematic, perspective view of another component of the present invention.

The present invention also comprises the face plate 78 and a sole plate 80, as shown in FIGS. 3 and 4. The face plate 78 and the sole plate 80 may be two separate pieces, but preferably, the face place 78 and the sole plate 80 have either been welded together, integrally formed together, or otherwise joined. The face plate 78 and the sole plate 80 are preferably constructed of a highly wear resistant material, such as titanium, titanium alloys or steel alloys, for instance stainless steel. An outer surface 82 of the face plate 78 may have one or more vertical and/or horizontal grooves 86. The grooves 86 help impart, or decrease, spin to a golf ball depending on groove design.

Face plates 78 and sole plates 80 of various sizes and shapes may be used to create club heads having different appearances. By way of example only, a face plate 78 that is slightly larger than the wound core 20 may be used, or a face plate 78 that is about the same size as the wound core 20 may be used. In the latter embodiment, the face plate 78 will be substantially flush with the finished club head. In the former embodiment, the face plate 78 will be slightly larger than the finished club head.

In the preferred embodiment, the face plate 78 and the sole plate 80 are located within the mold 64 adjacent the removable insert 74, as shown in FIG. 3. The mold 64 and at least one wall 76 of the insert 74 may be designed to securely receive the face plate 78 and/or sole plate 80 to prevent movement of the core during the molding step described below. For example, the mold 64 and wall 76 may have a complementary shape to the face plate 78 and/or the sole plate 80. Alternatively, it is well within the scope of the present invention to locate one or more mechanical fasteners (not shown), such as screws or pins, into the face plate 78 and/or sole plate 80 to removably secure the face plate 78 and the sole plate 80 with the core 20 in the mold 64.

Inside surfaces 84 of the face plate 78 and/or the sole plate 80 may be scored or scuffed, for instance by sand blasting or other known methods, to provide a gripping surface for the molding material described below.

As best seen in FIG. 3, the wound core 20 is located into the chamber 68 within the mold 64 where the chamber 68 has a substantially complementary shape to the wound core 20. The core prints 112 on the core 20 preferably fit into complementary shaped recesses 85 in the mold 64 to assist in locating the core 20 in a precise position within the mold 64. Preferably, a predetermined gap, or wall stock 88, is left between the wound core 20 and the chamber walls 89.

Weights to satisfy design criteria, i.e., center of gravity, may be positioned in the core mold and molded in place. The weights, if required, will be secured to the club head by the overmolding step described below.

Preferably, the wound core 20 is positioned in the chamber 68 so that it is approximately half above and approximately half below the channel 70. The channel 70 functions as a gate, as known by those skilled in the art. Those skilled in the art will appreciate that the core 20 can be located in the chamber 68 in any position, angle or orientation with respect to the channel 70.

One or more spacers 90 may also be located between the face plate 78 and the sole plate 80 and the wound core 20. The spacers 90 may be of any shape, size or dimension. In one embodiment, the spacers 90 are T-shaped (not shown) to provide a large surface area with which molding material, described below, comes in contact. The spacers 90 may have a knurled, or rough, outer surface to assist them becoming secured within a resin, described below.

The spacers 90 may be used to provide, i.e., control the thickness of, the wall stock 88 between the face plate 78, the sole plate 80 and the wound core 20.

Figure 5:
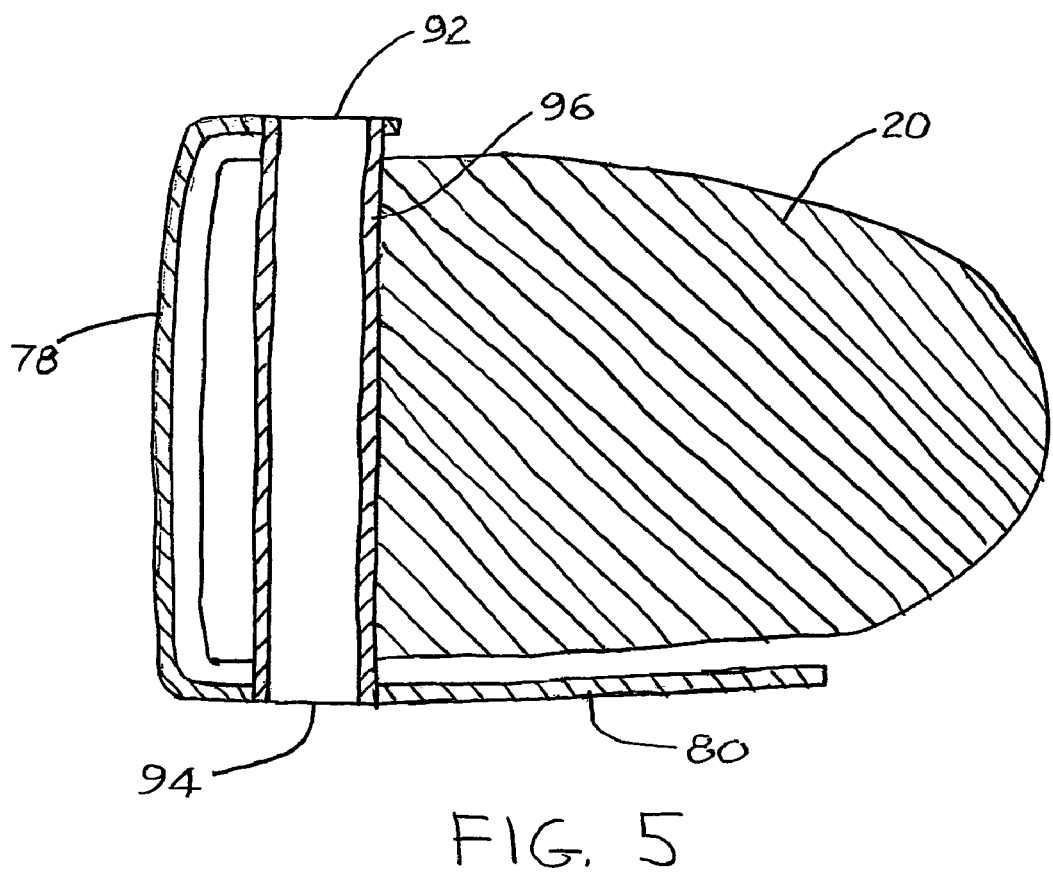
FIG. 5 is a schematic, cross section of a preferred embodiment of a structure for creating a shaft-receiving portion in the present invention.

As shown in FIG. 5, at least one aperture 92 is located in the face plate 78 and at least one aperture 94 is located in the sole plate 80. The apertures 92, 94 may be created when the face plate 78 and the sole plate 80 are formed, or the apertures 92, 94 may be located in the plates 78, 80 after formation, such as by drilling. A tube 96 is preferably located through the apertures 92, 94 in the face plate 78 and the sole plate 80 and secured by a press fit or friction fit, adhesive, brazing and/or welding. The apertures 92, 94 in the face plate 78 and the sole plate 80 are preferably located and aligned so that the tube 96, when inserted in the apertures 92, 94, is positioned adjacent the depression 40 in the core 20 for the shaft.

Referring now back to FIG. 3, a pre-determined quantity of a thermosetting-engineered resin 98 that is compatible with carbon fibers, e.g., epoxy or polyester resins, preferably epoxies, is located in the reservoir 66 of the mold 64. A thermoplastic-engineered resin that is compatible with carbon fibers may also be used. In the event a thermoplastic resin is employed, provision is made to cool the mold to effect cure of the resin.

Preferably, non-continuous filaments 100 of carbon and/or Kevlar®, or filaments 100 having specified physical and performance characteristics, are equally distributed and suspended within the resin 98. The resin 98 may be comprised of approximately 20% to approximately 70% filaments 100, but preferably the resin 98 is comprised of approximately 50% filaments 100.

The thermosetting resin 98 may be liquefied before being located in the reservoir 66, or it may be liquefied within the reservoir 66. The various resins 98 which may be used with the present invention have a liquefying point between 200 degrees Fahrenheit and 400 degrees Fahrenheit. Typically, the mold 64 is approximately 300 degrees Fahrenheit to 400 degrees Fahrenheit, so if the resin 98 is not liquefied before entering the reservoir 66, it will quickly become liquefied. In either case, the liquefied resin 98 is urged out of the reservoir 66 by any known means, including but not limited to, a pump, and/or a plunger 102. The plunger 102 may be driven by a clamping device such as a hydraulic press holding the two halves of the mold 64 closed together.

Those skilled in the art will also appreciate that an injection type mold can also be used without departing from the scope of the present invention. In an injection type mold (not shown), a rotating helical mixing device is located within the reservoir. The helical mixing device, when rotating, will decrease the length of any carbon and/or Kevlar® filaments within the resin.

In comparison, the transfer type mold 64 described and depicted herein does not have a mixing device so that the filaments 100 in the resin 98 retain their original length. Therefore, depending on the desired filament 100 length in the resin 98, either the injection type mold or the transfer type mold may be interchangeably used with the present invention.

The liquefied resin 98 flows under pressure from the reservoir 66 and through the channel 70, as through a gate as known by those skilled in the art. As described above, the wound core 20 is located within the mold 64 so that approximately half of the wound core 20 is located above the channel 70 and approximately half of the wound core is located below the channel 70. The liquefied resin 98 flows in substantially equal quantities around the wound core 20 in the wall stock 88 about the wound core 20. The resin 98 also flows around the inserts 30.

The liquefied resin 98 flows through the wall stock 88 to overmold the wound core 20. The pressurized resin 98 flows into any voids not filled by the continuous filament 46 on the core 20 and it permeates through the filament 46 located over the upper surface 28, the lower surface 24, the filament 46 over the front face 26 and the filament 46 in the grooves 42. The resin 98 is also located in the wall stock 88 between the wound core 20 and the face plate 78 and the sole plate 80 and between the tube 96 and the wound core 20.

A fiber filled resin coating (or an unfilled pure resin in circumstances where the resin is used for an improved surface finish) over the wound core 20 having a thickness of between approximately one five thousandths (0.005") of an inch to approximately one ninety thousandths (0.090") of an inch is desirable.

Figure 6:
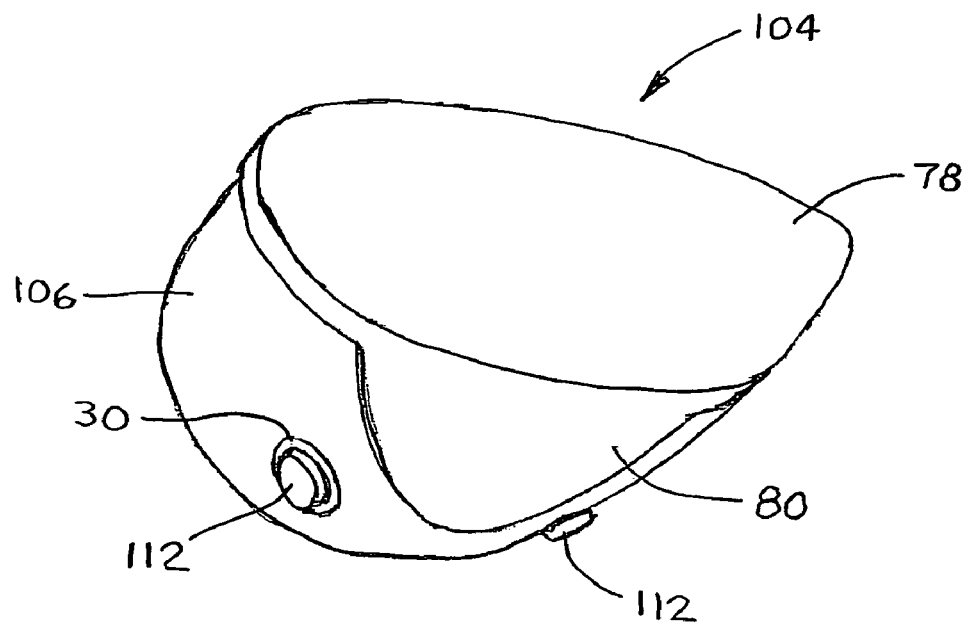
FIG. 6 is a schematic, perspective view of one embodiment of the present invention.

The resin 98 is allowed to cure under heat and pressure in the mold 64 for a pre-determined amount of time. Once the resin 98 is sufficiently cured, the overmolded core 20, now having the face plate 78, the sole plate 80 and the inserts 30 secured thereto and the tube 96 secured therein, referred hereinafter as the club head 104, is removed from the mold 64. An outer surface 106 of the club head 104 that was located adjacent the mold chamber walls 89 now has a surface dependent on fiber content. For example, the surface can be smooth, as shown in FIG. 6, or variegated.

Those skilled in the art will also appreciate that the walls 89 of the chamber 68 can be provided with any surface to provide a smooth outer surface 106 of the club head 104 or the walls 89 can be designed to create any design or pattern on the outer surface 106 of the club head 104. By way of example only, the walls 89 of the chamber 68 can be designed to create a leather-like or wood-like appearance on the outer surface 106 of the club head 104, or they can be designed to create a non-reflective surface on the outer surface 106 of the club head 104.

In any event, with a soluble core of the type described in U.S. Pat. No. 3,692,551, in the molded plastic club head 104, the core material/binder can be quite readily removed from the club head with water. For example, with a core 20 in which both the hardened salt binder and skin are water soluble, the head 104 with the core 20 is placed in a bath of water in a container or tank and a stream of water employed, with the bath, to dissolve the binder and flush the core material from the head 104. With this procedure, the shape of the core 20 is destroyed within the head 104 and the destruction product or core material dispersed therefrom.

Figure 7:
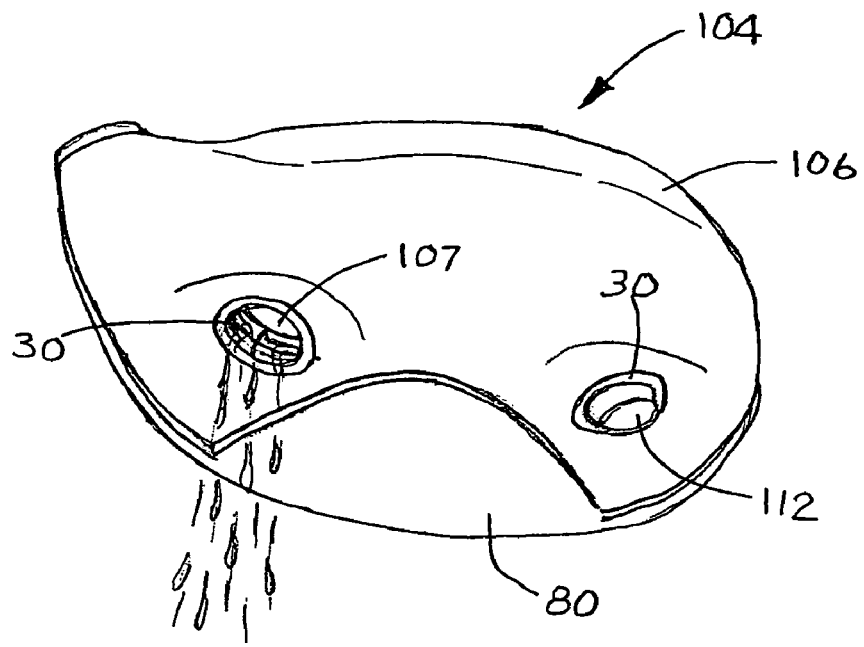
FIG. 7 is a schematic, perspective view of one embodiment of the present invention.

The liquid/solvent can directly contact the core 20 through a hole 107. The hole 107 was created during the above-described molding step as the resin 98 flowed around the insert 30 containing the core prints 112. Those skilled in the art will appreciate that one or more holes 107 may be located in the club head 104, such as, for example, by drilling. The dissolved binder and core material can be poured out from the club head 104, as shown in FIG. 7.

Figure 8:
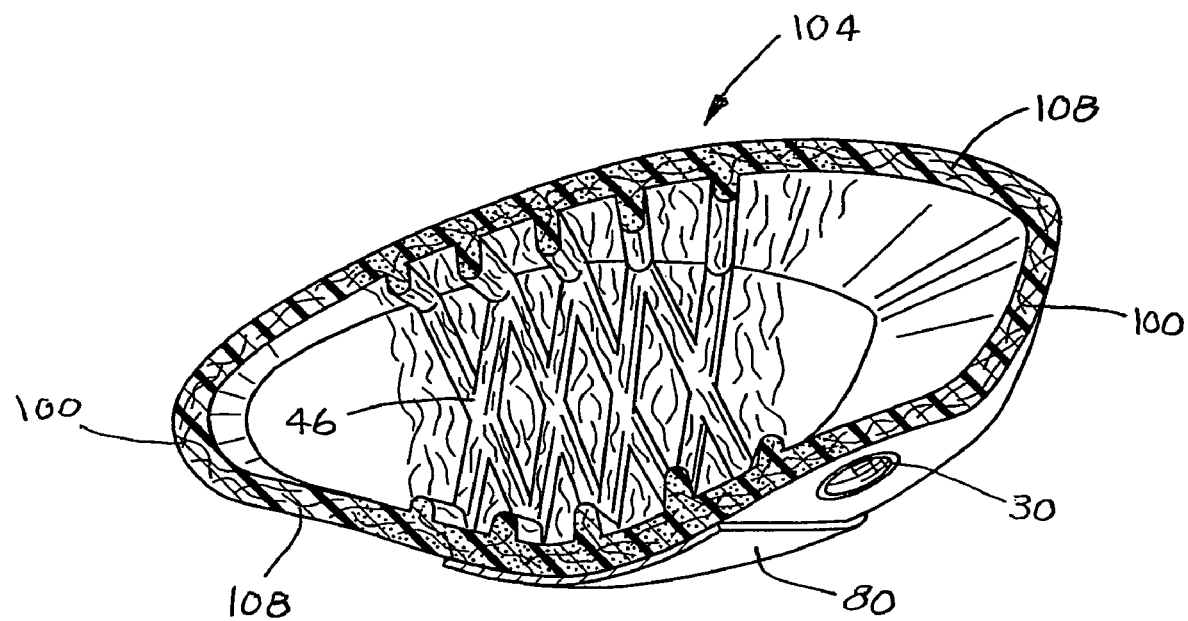
FIG. 8 is a schematic, cut-away view of one embodiment of a club head of the invention.

FIG. 8 schematically depicts a cut away view of the club head 104 with the core 20 removed and an insert 30 located in the club head 104. The overmolded continuous filament 46 in the walls 108 and ribs 110 formed by the grooves 42 of the club head 104 can be seen. Individual pieces of filament 100 can also be seen in the walls 108 of the club head 104.

FIG. 9 depicts the club head 104 with two molded in inserts 30. Those skilled in the art will appreciate that the inserts 30 can also be threaded into place and/or an adhesive or cement can be used.

Plugs 114, having a set of complementary threads to the threaded inserts 30, are threaded into the inserts 30. The plugs 114 cover the hollow inserts 30 and they can also be weighted to customize the weight of the club head 104. The plugs 114 can be equally weighted or they can have different weights. Channels 118 within the heads of the plugs 114 have a complementary design to a Phillips head screwdriver, standard head screwdriver, or hex wrench so the plugs 114 can be readily inserted or removed.

Those skilled in the art will appreciate that instead of, or in addition to, locating the weights as described above, the club head 104 can be drilled and inserts 30 and plugs 114 can be inserted in the holes, or weighted inserts can be molded into the core at selected areas.

Figure 10:
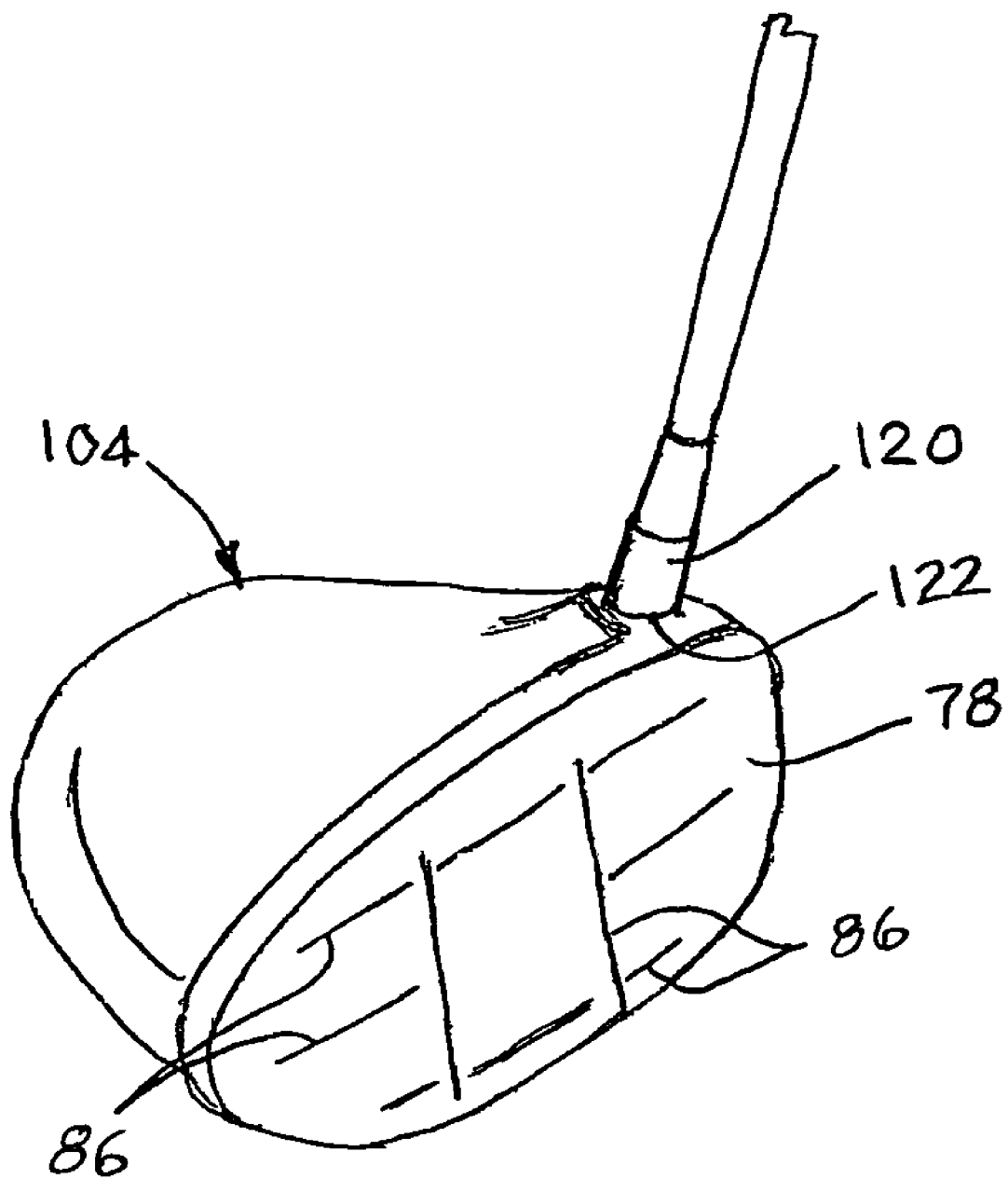
FIG. 10 is a schematic, perspective view of one embodiment of a club head produced in accordance with the invention.

A golf club head shaft 120 is frictionally and/or adhesively attached through a shaft locator aperture 122 in the face plate 78 and into the club head 104, as shown in FIG. 10. Within the club head 104, the shaft 120 is located within the tube 96 and secured thereto with friction and/or an adhesive as known to those skilled in the art.

The golf club head 104 assembled according to the steps described above robustly supports the face plate 78 to reduce, or prevent, deflection of the face plate 78 upon contact with a golf ball. Reducing, or preventing, deflection of the face plate 78 decreases energy absorption into the golf club head 104 and concentrates energy to the golf ball. Additionally, it can be appreciated that golf club heads 104 made according to the steps described herein may have different appearances than the preferred embodiment depicted in FIG. 10. For instance, the walls 108, the face plate 78 and the sole plate 80 of the club head 104 may have any shape or size in accordance with United States Golf Association standards.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of making a golf club head, comprising:
   winding a single continuous filament multiple times within a plurality of continuous grooves extending entirely about a soluble core, and then winding said filament over said core to produce a layer of filament about said core;
   locating said wound core in a mold;
   pressure coating said wound core in said mold with a resin, said resin dispersing among said filament windings;
   allowing said resin to cure and form a filament and resin shell about said core; and
   removing said soluble core from said shell while retaining said continuous filament in said shell.

2. The method of claim 1, wherein said filament is wound in said grooves in a first direction across said core and then in a second direction back across said core.

3. The method of claim 1, wherein said wound core is located in said mold with a face plate and a sole plate, said plates having been pre-positioned within said mold.

4. The method of claim 1, wherein said resin has a plurality of individual non-continuous filaments, separate from said single continuous filament, suspended therein.

5. The method of claim 3, wherein said face plate and said sole plate are secured to said shell by said resin.

6. The method of claim 1, wherein said grooves in said core, said resin and said single continuous filament form ribs in said shell, wherein said ribs support said face plate.

\* \* \* \* \*